United States Patent [19]

Bobear

[11] 4,061,609
[45] Dec. 6, 1977

[54] INHIBITOR FOR PLATINUM CATALYZED SILICONE RUBBER COMPOSITIONS

[75] Inventor: William J. Bobear, Latham, N.Y.

[73] Assignee: General Electric Company, Waterford, N.Y.

[21] Appl. No.: 675,377

[22] Filed: Apr. 9, 1976

[51] Int. Cl.² .............................................. C08L 1/00
[52] U.S. Cl. .................... 260/9; 260/37 SB; 260/46.5 G; 260/46.5 UA; 260/824 R; 260/825
[58] Field of Search ................ 260/46.5 UA, 46.5 G, 260/825, 824, 37 SB, 9

[56] References Cited
U.S. PATENT DOCUMENTS 3,539,530  11/1970  Karstedt .................... 260/46.5 UA

*Primary Examiner*—Melvyn I. Marquis
*Attorney, Agent, or Firm*—E. Philip Koltos; John L. Young; Frank L. Neuhauser

[57] ABSTRACT

A platinum catalyzed silicone rubber composition with an improved work life having as its base constituents 100 parts of a vinyl-containing polysiloxane where the vinyl concentration is at least 0.005 mole percent, at least 0.1 parts per million of a platinum catalyst and from 1 to 50 parts based on 100 parts of the vinyl-containing polysiloxane of a hydrogen-containing polysiloxane and further having as an inhibitor additive a compound with at least one radical of the formula,

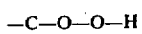

The preferred inhibitor compounds containing the hydroperoxy radical are tertiary butyl hydroperoxide, methylethylketone hydroperoxide, cumene hydroperoxide, 1,1,3,3,-tetramethylbutyl hydroperoxide and 2,5-dimethyl-2,5-dihydroperoxyhexane.

34 Claims, No Drawings

INHIBITOR FOR PLATINUM CATALYZED SILICONE RUBBER COMPOSITIONS

BACKGROUND OF THE INVENTION

The present invention relates to SiH-olefin platinum catalyzed compositions and more specifically relates to SiH-olefin platinum catalyzed compositions having as an inhibitor additive a compound with at last one hydroperoxy radical.

SiH-olefin platinum catalyzed compositions are well known in the art. Such compositions, in one aspect, comprise as the main ingredients vinyl-containing polysiloxane having a treated or untreated filler therein, a hydrogen-containing polysiloxane and finally a platinum catalyst which can be a solid platinum metal deposited on a solid carrier such as, gamma-alumina or a solubilized platinum complex. It is normal in such compositions to package the vinyl polysiloxane, the filler and the platinum catalyst in one package and to package the hydrogen-containing polysiloxane in a second package. When the fabricator or user of the material desires to produce a cured silicone elastomer he mixes the two packages in the specified proportions, fabricates the composition to the desired shape and allows the composition to cure either at room temperature over a period of time or at elevated temperatures in very short periods of time such as, in seconds or minutes.

The above-described compositions which are sold in two components or packages are usually referred to as room temperature vulcanizable silicone rubber compositions and more specifically, SiH-olefin platinum catalyzed room temperature vulcanizable silicone rubber compositions. It is understood that these types of compositions be cured either at room temperature over a perid of time such as, 1 hour or 12 hours after the two components are mixed together or over a very short period of time in seconds or minutes by heating the composition at temperatures above 100° or 200° C.

Such compositions will start curing as soon as the two components are mixed together and will usually cure or at least set in a 1 hour period even at room temperature. Accordingly, it has become desirable to incorporate into such compositions inhibitors which inhibitor additives when added to the composition will retard the curing of the composition when the two components are mixed together for a period of time of at least 12 hours so as to allow the composition to be fabricated to the desired shape before the composition sets. After mixing the two components together of such compositions and prior to their setting prior to the complete cure such that they cannot be molded further, it is desired to have as long a work life as possible. Accordingly, to increase the work life of such SiH-olefin platinum catalyzed composition and specifically compositions comprised of a vinyl-containing polysiloxane and a hydrogen-containing polysiloxane, it has been normal to incorporate into them various types of inhibitors. The function, as stated previously, of such inhibitor is to increase the work life of the composition prior to heating at elevated temperature or allowing the composition to cure at room temperature without impeding or in any way detracting from the final cure and properties of the composition to a silicone elastomer.

One advantage of such inhibitors in the past was to allow the composition to have as prolonged a work life at room temperature by simply heating the composition to allow it to cure in a manner of minutes thus arriving at the cured silicone elastomer fabricated part in an as expeditious and efficient time sequence as possible.

One prominent example of such inhibitors is, for instance, that to be found in the U.S. patent of Kookootsedes et al, U.S. Pat. No. 3,445,420, which discloses the use of acetylenic containing organic polymers and monomers as inhibitors for SiH-olefin platinum catalyzed compositions.

One disadvantage as brought out in Column 2 of the patent is that with the use of such acetylenic radical containing compounds the composition has to be sealed air tight since upon it being exposed to the atmosphere or in case of leaks to the atmosphere the acetylenic compound would evaporate and the inhibiting properties that were desired in the two component composition would be lost. It should be noted that normally SiH-olefin platinum catalyzed compositions which are packaged in two components do not have to be sealed in air tight containers.

Accordingly, it was highly desirable to find inhibitors for SiH-olefin platinum catalyzed compositions which would not necessitate air tight containers for packaging the two components of the SiH-olefin platinum catalyzed composition.

Another difficulty with the acetylenic compounds is that they are very unstable and explosive and accordingly they require careful manufacturing procedures in the preparation of the composition.

An additional defect in such acetylenic inhibitors which was even more prominent was that their effective rate of inhibition was not as high as would be desired.

In the past, the SiH-olefin platinum catalyzed compositions discussed above usually consisted of polysiloxane polymers having a viscosity of anywhere from 1,000 to 500,000 centipoise at 25° C, so that such polymers could be manipulated or worked at a much more efficient rate than was possible with higher viscosity polymers in terms of the work life of the prior art compositions and in terms of the effectiveness of the prior art inhibitors.

Accordingly, it was highly desirable to produce or develop a high viscosity SiH-olefin platinum catalyzed composition where the polymers, at least the base vinyl-containing polymer, would have a viscosity of anywhere from 1,000,000 to 200,000,000 centipoise at 25° C, since such high viscosity polymers would have higher tensile strengths. Such compositions would open a whole range of new uses for SiH-olefin platinum catalyzed compositions.

The difficulty with the developing of such high viscosity SiH-olefin platinum catalyzed compositions was that they normally had to be worked on a mill after the two ingredients were mixed together or in some other apparatus requiring extended work lives of at least 12 hours. Accordingly, in the past when such high viscosity SiH-olefin platinum catalyzed compositions were attempted the high viscosity material would cure on the mill upon the two components being mixed and the composition being worked to fabricate a product. An attempt to find proper inhibitors for such high viscosity SiH-olefin platinum catalyzed compositions did not meet with much success.

The comments with respect to the ineffectiveness of the prior art inhibitors applies to that therein disclosed in the above 3,445,420 patent with respect to such high viscosity compositions.

In another aspect, it was highly desirable to produce SiH-olefin platinum catalyzed compositions which could be prepared both for low viscosity materials and high viscosity materials that could be prepared in a one-component system, that is, be prepared with an inhibitor in the composition which would inhibit the cure of the composition for prolonged periods of time such as, 4 to 6 months. The purchaser of the material could then take the one-component material, whether of high or low viscosity, form the desired product from such composition and then by simply heating it at elevated temperatures to degrade the inhibitor would result in curing of the composition in a matter of minutes to produce the desired fabricated silicone elastomer part.

Accordingly, the prior art inhibitors were not effective enough to produce a work life of sufficient duration for high viscosity SiH-olefin platinum catalyzed room temperature vulcanizable silicone rubber compositions and were not effective enough to produce one-component SiH-olefin platinum catalyzed compositions.

Accordingly, it is one object of the present invention to provide an inhibitor for SiH-olefin platinum catalyzed compositions which is not susceptible to degradation or evaporation upon being exposed to the atmosphere.

It is another object of the present invention to provide an inhibitor for SiH-olefin platinum catalyzed compositions which is relatively stable compared to the acetylenic inhibitors.

It is an additional object of the present invention to provide an inhibitor for SiH-olefin platinum catalyzed room temperature vulcanizable silicone rubber compositions effective for providing an extended work life both for low viscosity and high viscosity SiH-olefin platinum catalyzed room temperature vulcanizable silicone rubber compositions and which is effective for providing extended shelf times for one-component SiH-olefin platinum catalyzed compositions.

It is yet an additional object of the present invention to provide for a process for producing a SiH-olefin platinum catalyzed room temperature vulcanizable silicone rubber composition with an inhibitor therein which composition has an extended work life both in the case of low viscosity compositions and high viscosity compositions and which compositions has a desirable shelf life in the case when one-component SiH-olefin platinum catalyzed room temperature vulcanizable silicone rubber compositions are desired to be produced.

These and other objects of the present invention are accomplished by means of the disclosure set forth herein below.

SUMMARY OF THE INVENTION

In accordance with the above objects there is provided by the present invention a platinum catalyzed silicone rubber composition with an improved work life comprising (a) 100 parts of a vinyl-containing base linear polysiloxane of the formula.

(1)

and blends of such polysiloxanes where R is selected from the class consisting of alkyl radicals of 1 to 8 carbon atoms, vinyl radicals, phenyl radicals, fluoroalkyl radicals of 3 to 10 carbon atoms and mixtures thereof, wherein the vinyl radical concentration in said polymer is at least 0.005 mole percent and a varies from 1.98 to 2.01; (b) at least 0.1 parts per million of platinum; (c) from 1 to 50 parts of a hydrogen containing polysiloxane; and (d) at least 0.007 parts of an inhibitor compound having at least one radical —C — O — O — H per 100 parts of said vinyl-containing linear base polysiloxane.

It should be mentioned that the instant invention does not reside in a platinum catalyst and any type of platinum catalyst can be utilized in the present composition whether it be a solid platinum or gamma-alumina or other solid carrier or whether it be a platinum complex such as the solubilized platinum complexes well known in the art. Preferably, the vinyl-containing linear base polysiloxane has the formula,

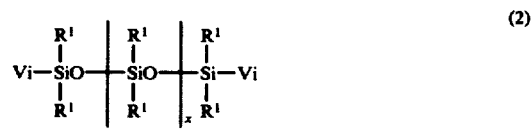
(2)

and has a viscosity that varies from 1,000 to 300,000,000 and more preferably varies from 1,000,000 to 200,000,000 centipoise at 25° C, wherein in formula (2) the Vi is vinyl and $R^1$ is selected from the class consisting of vinyl, phenyl, alkyl radicals of 1 to 8 carbon atoms, and fluoroalkyl radicals of 3 to 10 carbon atoms and mixtures thereof and where x varies from 2,500 to 11,000. They may be mixed into the base polymer also a vinyl-containing polysiloxane where the vinyl is appended to the silicon atoms in the internal part of the polysiloxane polymer chain. Such a vinyl-containing polysiloxane is preferably of low viscosity and acts both as a diluent and as a reinforcing agent for the final cure of the elastomer. It can be appreciated that the vinyl-containing base polymer may be one polymer or a blend of vinyl-containing polymers and more specifically a blend of the vinyl-containing polymer of formula (2), with other vinyl-containing polymers having vinyl units both on the terminal position of the polysiloxane chain as well as the internal positions on the polysiloxane chain. The hydrogen-containing polysiloxane cross-linking agent may be any hydrogen-containing polysiloxane such as, a silicone resin as will be more clearly specified herein below or as a hydrogen-containing polysiloxane of a viscosity of anywhere from 1 to 10,000 centipoise at 25° C, as will be specified hereinbelow.

In addition, various other additives may be added to the composition such as, fillers and pigments, heat-aging additives and other types of additional ingredients normally associated with the fabrication of such compositions. Generally, the inhibitor may be utilized in a concentration of 0.007 to 20 parts per 100 parts of the vinyl-containing polysiloxane or blends of such vinyl-containing base polysiloxanes and more preferably the inhibitor may be present in the concentration of 0.01 to 10 parts. All parts in the present specification are by weight.

There is envisioned by the present invention that the composition defined above can be justified with the platinum catalyst and the inhibitor as well as the vinyl-containing polysiloxanes and fillers in one separate component and the hydrogen containing polysiloxane cross-linking agent can then be packaged as a primary ingredient in a second component. The two components are thus stored separately and not mixed until it is desired to obtain the curing of the composition to a silicone elastomer.

It is also envisioned by the present invention where all the ingredients are mixed together to form a one-component package system and where the composition is stored and at a time of desired cure is simply fabricated to the desired article and heated at elevated temperatures to produce the desired silicone elastomer. Any compound containing at least one hydroperoxy radical may be utilized as an inhibitor and it is intended to claim such in the instant invention. The more preferred inhibitor compounds are tertiary butyl hydroperoxide, methylethyl ketone hydroperoxide, cumene hydroperoxide, 1,1,3,3,-tetramethylbutylhydroperoxide and 2,5-dimethyl-2,5-dihydroperoxy hexane.

In an additional embodiment in the present invention, as has been stated previously, there is provided a process by which the basic ingredients alone or with the additional other ingredients specified above, such as the fillers, are mixed together and the composition is allowed to cure either over a prolonged time at room temperature or at a rapid rate at elevated temperatures.

DESCRIPTION OF THE PREFERRED EMBODIMENT

As a basic constituent there is present in the present composition the vinyl-containing polysiloxane of formula (1), wherein the polymer contains at least 0.005 percent vinyl and preferably contains from 0.01 to 1 mole percent vinyl. Preferably, the polymer is linear and preferably the vinyl is at the terminal positions of the linear polymer chain. However, broadly, in accordance with the present invention the vinyl radicals can be on any part of the polymer chain. Irrespective of whether there is some polymer chain vinyl in the polymer, it is preferred that there be at least some terminal vinyl groups in the polymer. It is understood that this polymer can be a single polymer species or it can be a blend of vinyl containing polymer materials which can have different viscosities of anywhere from 1,000 to 300,000,000 centipoise at 25° C, with the final blend having a viscosity varying from 11,000 to 300,000,000 centipoise at 25° C.

Most preferably, the polymer of formula (1) has a viscosity that varies from 1,000,000 to 200,000,000 centipoise at 25° C. The other substituent groups in addition to the vinyl radical can be any monovalent hydrocarbon radicals or halogenated monovalent hydrocarbon radicals, preferably not exceeding 10 carbon atoms. Most preferably, the R substituent group is selected from lower alkyl radicals of 1 to 8 carbon atoms, vinyl radicals and phenyl radicals and also fluoroalkyl radicals of 3 to 10 carbon atoms such as, trifluoropropyl.

The most preferred polymer species within the scope of the vinyl-containing polymer of formula (1) is the vinyl-containing polymer of formula (2), that is, where the polymer of formula (1) is a strictly linear polymer with vinyl radical terminal units. This polymer or blend of such polymers may have a viscosity of anywhere from 1,000 to 200,000,000 centipoise at 25° C, but is preferably a polymer that has a viscosity of 1,000,000 to 200,000,000 centipoise at 25° C. It can be understood that when the polymers of formula (2) are utilized within those polymers of the scope of formula (1), that the polymers of formula (2) need not be a single polymer species but may be a blend of vinyl-containing polymers of the formula of formula (2) of different viscosities. In that respect, it should be noted that none of the R' radicals can be vinyl, although in most instances it is preferred that R' not be a vinyl radical within the scope of formula (2). It is possible to produce compositions within the instant invention where none of the R' radicals are vinyl within the vinyl concentrations specified previously.

It should also be noted that for high viscosity systems it is preferred that the vinyl-containing polymers or blends of such polymers of formulas (1) and (2) have a viscosity of 1,000,000 to 200,000,000 centipoise at 25° C. However, for one-component systems and with the present inhibitor additive of the present invention it is preferred that the vinyl-containing polymers within the scope of formulas (1) and (2) have a viscosity of anywhere from 1,000 to 500,000 centipoise at 25° C, and generally have a viscosity of anywhere from 1,000 to 1,000,000 centipoise at 25° C.

In the formula within the scope of formula (2), R' may be selected from vinyl and may be on any portion of the polymer chain within the scope of formula (2). However, only a minimal part of R' radicals may be vinyl radicals in accordance with the disclosure set forth herein above. Preferably, R' is selected from the class consisting of phenyl, lower alkyl radicals of 1 to 8 carbon atoms and fluoroalkyl radicals of 3 to 10 carbon atoms such as, trifluoropropyl. However, the R' radicals may be selected from any monovalent hydrocarbon radicals and halogenated monovalent hydrocarbon radicals of less than 10 carbon atoms.

In accordance with the disclosure set forth hereinabove, the viscosity of the polymer in formula (2) may vary anywhere from 1,000 to 300,000,000 centipoise at 25° C, and the value of x may vary from 330 to 11,000. With this basic constituent of the present invention there is needed a hydride cross-linking agent. Any hydride cross-linking agent normally utilized in SiH-olefin platinum catalyzed reactions to form silicone elastomers or silicone polymers may be utilized in the instant case. The preferred hydride cross-linking agents for utilization in the formation of silicone elastomers either at room temperature or elevated temperatures are disclosed below. For instance, there may be utilized a hydride cross-linking agent composed of,

units and $SiO_2$ units where the ratio of $R^3$ to Si moieties varies from 1.1 to 1.9 and $R^3$ is selected from the class consisting generally of any monovalent hydrocarbon radicals or halogenated monovalent hydrocarbon radicals of up to 10 carbon atoms. More preferably, $R^3$ is selected from the class consisting of alkyl radicals of 1 to 8 carbon atoms, phenyl radicals and fluoroalkyl radicals of 3 to 10 carbon atoms. A specific desirable fluoroalkyl radical being trifluoropropyl. Generally, for any hydride cross-linking agent utilized in the instant invention, it is preferred that the hydride cross-linking agent have a hydride content broadly of 0.05 to 5% and more preferably of 0.1 to 1% by weight.

Another hydride cross-linking agent may be utilized is not only one containing monofunctional units and tetrafunctional units but also one composed of monofunctional units, tetrafunctional units and diffunctional units. For instance, there may be utilized as a hydride cross-linking agent in the instant invention a hydride silicone resin composed of

units, $SiO_2$ units and $(R^3)_2SiO$ units where the $R^3$ to Si moiety ratio may vary from 1.5 to 2.1. Again, it is necessary that the hydride content of this silicone resin be within the specification set forth above if the proper cross-link density is to be obtained in the final cured product. Broadly speaking, the $R^3$ radical may be selected from any monovalent hydrocarbon radical or halogenated monovalent hydrocarbon radical of up to 10 carbon atoms, but more preferably the $R^3$ radical is selected from lower alkyl radicals of 1 to 8 carbon atoms, phenyl radicals and fluoroalkyl radicals of 3 to 10 carbon atoms, the most preferred fluoroalkyl radical being trifluoropropyl.

It should also be noted that such hydride cross-linking agents desirably may not have any vinyl units in them or other unsaturated groups since this may result in accelerated curing of the composition. However, this is not a stringent requirement in the present composition as would be with prior art compositions because of the inhibitor additive in the instant compositions. Accordingly, a certain amount of unsaturation can be tolerated in the hydride cross-linking agents in the compositions of the instant case. The only undesirable aspect of having a certain amount of unsaturation in the hydride cross-linking agent is that the proper cross-linked density may not be obtained. Generally, less than 0.001 mole percent of unsaturated radicals can be tolerated in the instant hydride cross-linking agent when the inhibitor compound additive of the instant case is utilized and the optimum physical properties in the cured composition are desired.

Another preferred hydride cross-linking agent is that of the formula,

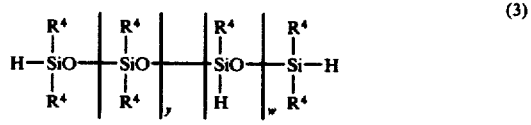

It should be noted that even though the above compound of formula (3) is linear that hydride-containing branch-chained polymers can be utilized as hydride cross-linking agents in the instant invention. However, a polymer that is linear such as that of Formula (3), is desirable because it results in a cured elastomer of optimum physical properties. Preferably, in formula (3), $R^4$ generally may be selected from any monovalent hydrocarbon radicals or halogenated monovalent hydrocarbon radicals, preferably, of up to 10 carbon atoms. More preferably, $R^4$ is selected from alkyl radicals of 1 to 8 carbon atoms, phenyl, fluoroalkyl radicals of 3 to 10 carbon atoms and hydrogen, the preferred fluoroalkyl radical being trifluoropropyl. Accordingly, the hydride polysiloxane polymer cross-linking agents generally may have a viscosity of anywhere from 1 to 100,000 centipoise at 25° C, and more preferably have a viscosity of anywhere from 1 to 10,000 centipoise at 25° C. In formula (3), preferably $v$ may vary anywhere from 1 to 1000 and $w$ may vary from 0 to 200. Although the hydrogen atoms in the hydrogen polysiloxane polymer of formula (3) may be solely located in the terminal positions of the polymer chain, there can also be some hydrogen atoms in the internal position of the polymer chain. The terminal location of the hydrogen atom is desired for optimum physical properties in the cured composition. In this respect, it is also true that the particular hydride cross-linking agent will be selected depending on the end use for which the composition is intended. However, the hydride resins disclosed and the hydrogen polysiloxane of formula (3) are the preferred hydride cross-linking agents for the production of silicone elastomers. Preferably, the viscosity of the polymer of formula (3) varies, as stated previously, from 1 to 10,000 centipoise at 25° C, and more preferably varies from 1 to 1,000 centipoise at 25° C.

Another necessary ingredient in the instant composition is a platinum catalyst. Generally, there must be utilized at least 0.1 parts per million of a platinum catalyst in terms of parts of platinum metal. This platinum catalyst may be in any form. It may be a solid platinum metal deposited on a solid carrier or it may be a solubilized platinum complex. Any type of platinum catalyst will work in the instant invention. More preferably, the platinum complex is a solubilized platinum complex. Many types of platinum compounds for this SiH-olefin addition reaction are known and such platinum catalysts may be used for the reaction of the present case. The preferred platinum catalysts especially when optical clarity is required are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2.C_3H_6)_2$ described in U.S. Pat. No. 3,159,662, Ashby.

Still, further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in Karstedt, U.S. patent 3,814,730. Generally speaking, this type of platinum complex is formed by reacting chloroplatinic acid containing 4 moles of water of hydration with tetravinylcyclotetrasiloxane in the presence of sodium bicarbonate in an ethanol solution.

In a general aspect, per 100 parts of the vinyl-containing polymers of formulas (1) or (2) and blends of such polymers there is utilized at least 0.1 parts per million of platinum metal and more preferably 1 to 50 parts per million of platinum metal whether utilized as solid platinum deposited on a solid carrier or a solubilized platinum complex. With these ingredients there is utilized generally from 1 to 50 parts of the hydride cross-linking agent within the specification set forth above for hydride content, and more preferably from 1 to 25 parts of the hydride cross-linking agent.

The final basic ingredient in the instant composition is the inhibitor. Accordingly, in the present mixture there must be at least 0.007 parts per 100 parts of the vinyl-containing polymer of an inhibitor compound which can be any organic or silicone compound containing at least one hydroperoxy radical. It has been found that the inhibition level in the curing of the instant composition is accomplished by the presence of the hydroperoxy radical. It has been found tha there must be at least 0.007 parts of the inhibitor compound present to effect some inhibitor activity on the present composition. However, the amount of inhibitor compound that is added to the composition will vary in accordance with a particular application of the composition as can be appreciated. The higher the level of the inhibitor that is present, the longer the composition will be shelf stable for a one-component system and the longer the composition will have a work life if it is a two-component system. For most applications, the concentration of the hydroperoxy inhibitor compound may vary anywhere from 0.01 to 10 parts by weight per 100 parts of the base vinyl-containing compound. However, higher levels of inhibitor compound may be utilized, as desired, to further increase the shelf stability of a one-component or to increase the work life of a two-component system such that there can be obtained a shelf stability of as much as 6 months or more and a work life of a number of weeks, if necessary. The above preferred range of concentration is given only for most applications of SiH-olefin platinum catalyzed compositions.

As far as the structure of the hydroperoxy containing compound it can have any desired structure as long as it contains a hydroperoxy radical in the molecular structure because it is such hydroperoxy radical that accomplishes the inhibiting activity for reasons that are not known.

Other hydroperoxy inhibitor compounds that may be utilized in the instant invention are, for instance, methylethylketone peroxides, cumene hydroperoxide, 1,1,3,3-tetramethylbutylhydroperoxide and 2,5-dimethyl-2,5-dihydroperoxy hexane.

Other compounds that may be utilized are methylethylketone peroxide, cumene hydroperoxide, t-butyl hydroperoxide, 1-hydroxycyclohexyl hydroperoxide, 1,1,3,3-tetramethylbutyl hydroperoxide, 2,5-dimethyl-2,5-dihydroperoxy hexane, decalin hydroperoxide, 1,1,2,2-tetramethylpropyl hydroperoxide, p-methane hydroperoxide and pinane hydroperoxide. These compounds are manufactured and sold by Pennwalt Corp., Hercules, Inc.,and Lucidol Chemical Co.

The above compounds are only exemplary and many others can be utilized since compounds containing hydroperoxy radicals are well known.

In terms of the packaging of the instant basic composition, the inhibitor compound may be packaged either with the vinyl-containing compound or it may be packaged with the hydride cross-linking agent. In a two-component system, the vinyl-containing polymer of formulas (1) and (2) above is packaged separately from the hydride cross-linking agent. The platinum catalyst is normally compounded or mixed in with the vinyl-containing polymers of formulas (1) and (2). The inhibitor compound may then be inserted or mixed with the hydride cross-linking agent especially so if the hydride cross-linking agent contains any unsaturation. In most cases it would be preferred to mix the inhibitor compound along with the platinum catalyst in the vinyl-containing polymers of formulas (1) and (2). Accordingly, when it is necessary to cure the composition the two components are mixed together and by the passage of time at room temperature or by the utilization of elevated temperatures to decompose the inhibitor compound, the composition can be cured to a silicone elastomer.

These are the basic ingredients of the instant composition. As far as the production of the polymers within the scope of formulas (1) and (2), these are well known compounds. Reference is made to the patent of Jeram and Striker, U.S. Pat. No. 3,884,866, whose disclosure is hereby incorporated by reference. Such polymers are usually made by the equilibration of vinyl-containing cyclic polysiloxanes or non-vinyl containing chain stoppers at elevated temperatures to produce high viscosity vinyl-containing polymers. Such equilibration reactions are carried out with the use of alkali metal catalysts or in the case in the production of low viscosity vinyl-containing polymers by the use of acid catalysts such as, toluene sulfonic acid or acid-activated clay. In the case when the polymer is desired to contain some fluoroalkyl groups then a slightly different procedure is utilized such as, for instance, that disclosed in the issued patent of John Razzano, U.S. Pat. No. 3,937,684. The hydride cross-linking agents are also well known as disclosed in the above Jeram and Striker 3,884,866 patent. Simply stated, the hydride resins are simply produced by the hydrolysis of the appropriate hydrochlorosilanes in a two-phase hydrolysis system, that is, with a water immiscible solvent and water, and separating the resulting hydrolyzate.

In the case of fluorosilicone-containing hydride cross-linking agents, special procedures have to be utilized, for instance, those disclosed in the following Jeram patent applications: Jeram - Ser. No. 619,592, filed Oct. 6, 1975 entitled "Solvent Resistant Room Temperature Vulcanizable Silicone Rubber Compositons", and Jeram - Ser. No. 619,691, filed Oct. 6, 1975, entitled "Solvent Resistant Room Temperature Vulcanizable Silicone Rubber Compositions", whose disclosures are hereby incorporated into the present case by reference.

The hydrogen polysiloxane cross-linking agent of formula (3) is also produced by equilibration processes or by hydrolysis processes and more generally by the equilibration of tetrasiloxanes with the appropriate hydride chain-stoppers in the presence of an acid activated equilibration catalyst. For instance, the processes disclosed in U.S. Pat. No. 3,853,933 - Siciliano and U.S. Pat. No. 3,853,934 - Siciliano and Holdstock, may be utilized. In the case again where the polymer is a fluorosilicone containing polymer the special procedures disclosed in the above Razzano, U.S. Pat. No. 3,937,684 have been utilized.

It should be noted, as stated above, that the above composition by utilizing enough inhibitor compound in the basic or modified composition of the instant case can be made into a one-component system, that is, where all the ingredients are mixed together and the composition is utilized to prepare a fabricated part and simply heated at elevated temperatures to create the cured silicone elastomer in a matter of minutes by decomposing the hydroperoxy inhibitor.

By the utilization of the present inhibitor compounds and sometimes in quantities in excess of 15 parts per 100 parts of the vinyl-containing polymers of formulas (1) and (2), the present composition can be packaged into a single component which at room temperature will have a shelf life of 6 months to a year, but which when heated at elevated temperature would cure into a silicone elastomer in a matter of minutes. By reference to elevated temperatures, it is meant temperatures above 100° C. As can be appreciated, the higher temperature such as, 150° to 200° C can be utilized.

As stated previously, when such a one-component system is prepared it is preferred that the vinyl-containing polymer or blends of polymers have a viscosity of anywhere from 1,000 to 1,000,000 centipoise at 25° C, such that the total mixture will not have a viscosity exceeding 1,000,000 centipoise at 25° C. However, in accordance with the present invention, one-component compositions having a viscosity above 1,000,000 centipoise can also be prepared. In accordance with the present invention, such a one-component system is simply prepared by mixing all the basic ingredients together which is composed of the vinyl-containing polysiloxanes, the hydride cross-linking agent which also may be composed of a single type of hydride cross-linking agent of the ones disclosed above, or a mixture of such hydride containing cross-linking agents, the platinum catalyst and the inhibitor additive.

There may be added other ingredients to the basic composition of the instant case. There may be utilized as a reinforcing agent to give the final composition good physical strength, a vinyl-containing polysiloxane which is utilized at a concentration of anywhere from generally 1 to 50 parts to preferably 1 to 25 parts per 100 parts of the basic vinyl-containing polymer of formulas (1) and (2) of a compound of the formula,

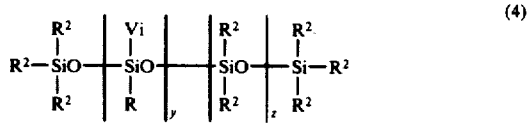

(4)

In this formula, formula (4), the vinyl units are only in the internal portion of the polymer chain. Again, the vinyl content of this polymer must be such that the vinyl concentration of the total vinyl-containing polymers must be at least 0.005 mole percent and may vary anywhere from 0.01 to 1 mole percent. Although a higher vinyl content may be utilized, it serves no purpose and decreases the strength of the composition. In formula (4), Vi is vinyl and the $R^2$ radical may be selected from any monovalent hydrocarbon radical or halogenated monovalent hydrocarbon radical of up to 10 carbon atoms. More preferably, the $R^2$ radical of formula (4) is selected from alkyl radicals of 1 to 8 carbon atoms, phenyl radicals, fluoroalkyl radicals of 3 to 10 carbon atoms, preferably, trifluoropropyl, and mixtures thereof, where $y$ varies from 1 to 4,000 and $z$ varies from 1 to 4,000 and which polymer has a viscosity that generally varies anywhere from 1,000 to 1,000,000 centipoise at 25° C, and more preferably varies from 50,000 to 500,000 centipoise at 25° C. Such vinyl-containing polymers may be produced in accordance with the processes set forth in the aforesaid Razzano and Jeram/Striker patents mentioned above. These polymers of formula (4) are basically for the purpose of reinforcing the strength of the basic composition in the absence of a filler. Vinyl-containing silicone resins may also be utilized and specifically vinyl-containing silicone resins having fluoroalkyl substituted groups may be utilized as an additional or alternative additive in the present composition. Such resins are disclosed in the above Jeram patent applications which are hereby incorporated by reference, as well as the processes for producing them. Preferably, the vinyl-containing polymer of formula (4) has a viscosity that varies anywhere from 50,000 to 500,000 centipoise at 25° C even for higher viscosity compositions.

The other additive that may be utilized in the instant invention is a filler and accordingly per 100 parts of the basic vinyl-containing polymer there may be utilized anywhere from 5 to 150 parts of a filler selected from the class of well known reinforcing fillers such as, fumed silica and precipitated silica and extending fillers such as, titanium oxide. For instance, there may be utilized a filler in the broad range set forth above or more preferably in the range of 10 to 75 parts which filler is selected from the class consisting of titanium oxide, lithopone, zinc oxide, zirconium silicate, silica aerogel, iron oxide, diatomaceous earth, calcium carbonate, fumed silica, cyclic polysiloxane treated silica, silazane treated silica, precipitated silica, glass fibers, magnesium oxide, chromic oxide, zirconium oxide, alpha quartz, calcined clay, asbestos, carbon, graphite, cork, cotton and synthetic fibers. The reinforcing fillers of fumed silica and precipitated silica are preferred when a high strength in the resulting silicone elastomer is desired, expecially fumed and precipitated silica which have been treated with silicone compounds as is well known in the art. However, in the case when it is desirable not to increase the uncured viscosity of the composition to too high a level which is sometimes caused by the reinforcing fillers, then the other fillers may be utilized. Also, it is well known in the art that extending fillers may be used in combination with reinforcing fillers, treated or untreated, to get the proper balance in final physical properties in the silicone elastomer. Other additives may be utilized in the instant composition as is well known in SiH-olefin platinum catalyzed composition. Accordingly, the additional additives that may be added to such basic composition of the instant case to produce desired end properties in the cured silicone elastomer are many. For instance, there may be utilized additional flame retardant additives; there may be utilized heat aging additives as well as pigments and process aids such as that disclosed in Konkle, U.S. patent 2,890,188. It is only necessary that the additive does not interreact with the hydroperoxy radical such that the hydroperoxy inhibitor compound loses its effectiveness.

What has been disclosed and claim is the basic composition to produce a silicone elastomer either from the one-component or two-component system with the required shelf stability or work life.

In addition, examples of treating agents for the fillers as well as other additives that may be added to the basic composition of the instant case is disclosed in the above patents and patent applications of Jeram and Jeram/Striker.

It has been found that ordinary peroxides will function only slightly as inhibitors in the instant compositions. What has been found as the outstanding inhibitors in accordance with the present invention are compounds containing hydroperoxy radicals in the concentrations set forth above although such concentration ranges, as stated previously, are not critical.

The examples below are given for the purpose of illustrating the instant invention and are not intended in any way of manner to limit or define the instant invention and specifically as to the type of hydroperoxy inhibitor compounds that may be utilized in accordance with the instant invention in SiH-olefin platinum catalyzed reactions. All parts in the examples are by weight. The examples are also intended to illustrate the operation of the instant inhibitor compounds as well as testing of other materials that functioned slightly if at all as inhibitors.

EXAMPLE 1

There was prepared a basic composition, Composition A, composed of 80 parts by weight of a vinyl-terminated chain-stopped dimethylpolysiloxane of 20,000,000 centipoise viscosity at 25° C. To this there was added 20 parts by weight of an 0.6 mole percent vinyl-containing methylpolysiloxane where the vinyl was in the internal portion of the polymer and chain. The polymer was trimethyl end-stopped, which polymer had a viscosity of 55,000,000 centipoise at 25° C. To this there was added 3 parts of a silanol-containing polysiloxane process aid of 10 to 30 centipoise at 25° C, where the other substituent groups in the polymer were methyl. Such process aids which can be utilized in the instant invention to facilitate the preparation of high viscosity compositions, specifically, compositions having a viscosity of 1,000,000 to 300,000,000 centipoise at 25° C. To this mixture there was added 65 parts by weight of fumed silica treated with octamethylcyclotetrasiloxane in accordance with Lucas, U.S. Pat. No. 2,938,009, which is hereby incorporated by reference. To 168 parts of this basic composition there was added 1 part of tetriary butyl hydroperoxide 70 (the 70 disclosing the amount of the hydroperoxide compound present by weight in the solvent in which it is sold) which was added at a level of 1 part by weight. To this mixture there was then added 0.02 parts of Lamoreaux platinum catalyst as disclosed above and 3.2 parts of a hydride crosslinking agent of the formula,

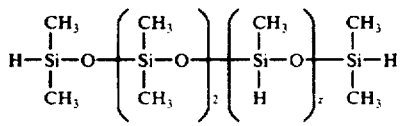

where $s$ and $z$ are such that the viscosity of the above polymer was 50 centipoise at 25° C.

The resulting cured silicone elastomer which had a work life of 3 days had the following physical properties:

Shore A; 75
Tensile Strength (psi); 1181
Elongation (%); 660
Tear Strength (pi) Die B; 277

When 1 part of tertiary butyl peroxy isopropyl carbonate was utilized in the same composition in place of the hydroperoxy additive there was obtained a work life at room temperature of 3½ hours and the composition had the following physical properties:

Shore A; 77
Tensile Strength (psi); 1152
Elongation (%); 580
Tear Strength (pi) Die B; 289

It should be noted that while ordinary peroxy radicals have some work life extending activity they do not in any way or manner approach the efficiency and the shelf lift stability imparted to the composition by the hydroperoxy compounds of the instant case.

It should also be noted from above, that the hydroperoxy inhibitor additive in the present composition does not detract in any way or manner or degrade the final physical properties of the cured silicone elastomer. The hydroperoxy compound decomposes and has no effect whatsoever on the final properties of the cured silicone elastomer as compared to physical properties obtained without the use of such a hydroperoxy inhibitor compound. Table I below discloses parts by weight of the additives listed which were utilized in the SiH olefin composition described above, the only change being the type of inhibitor additive and the parts of such inhibitor additive by weight that was utilized in the composition. The following compounds were tested which are identifided by tradename in Table I below and their chemical names are as follows:

Lupersol 101 — 2,5-dimethyl-2,5-bis(t-butyl peroxy)
Lupersol 130 — 2,5-dimethyl-2,5-bis(t-butyl peroxy) hexyne-3
Lupersol DDM — methyl ethyl ketone peroxides in dimethyl phthalate
Cadox BS — dibenzoyl peroxide in silicone oil
Cadox Ps — bis(p-chlorobenzoyl)peroxide in silicone oil Accordingly, a test with the above additives disclosed the following results:

TABLE 1

| Peroxide Type | Parts | Work Life of Compound | Shore A | Tensile Strength (psi) | Elongation (%) | Tear Strength (pi), Die B |
|---|---|---|---|---|---|---|
| Lupersol 101 | 1 | Cured on Mill | | | | |
| Lupersol 101 | 2 | Cured on Mill | | | | |
| Lupersol 130 | 1 | 4 days | 68 | 1365 | 700 | 226 |
| t-butyl perbenzoate | 1 | 2¼ Hours | | | | |
| di-t-butyl peroxide | 1 | Cured on Mill | | | | |
| t-butyl hydroperoxide-70 | 0.05 | 2 days | 65 | 1266 | 820 | 269 |
| t-butyl hydroperoxide-70 | 0.5 | 4 days | 64 | 1251 | 860 | 255 |
| t-butyl hydroperoxide-70 | 1 | 10 days | 74 | 1141 | 680 | 259 |
| t-butyl hydroperoxide-70 | 2 | 21 days | 74 | 1101 | 630 | 244 |
| t-butyl hydroperoxide-90 | 0.5 | 14 days | 58 | 1154 | 910 | 236 |
| Lupersol DDM | 0.05 | 12 days | 72 | 1127 | 700 | 286 |
| Lupersol DDM | 0.1 | >12 days | 71 | 1137 | 740 | 283 |
| Lupersol DDM | 1 | >21 days | 76 | 1046 | 620 | 243 |
| Lupersol DDM | 2 | >21 days | 74 | 996 | 700 | 226 |
| Cadox BS | 2 | <5 hours | | | | |
| Cadox PS | 2 | <5 hours | | | | |

The number after the t-butyl hydroperoxy indicates the solids content of the hydroperoxy in the solution in which it is sold. Manufacturers of these hydroperoxy compounds are, for instance, Lucidol Chemical Co. and Noury Chemical Co. The data in Table I indicates that the hydropeoxy inhibitor additives are much more efficient as inhibitor additives even at extremely low levels than other types of compounds that may be utilized for such a purpose. The results of Table I, as well as the other results above, also indicate that it is the hydroperoxy radical and not just a peroxy radical that imparts this inhibition activity to the composition.

EXAMPLE 2

The basic composition having therein the polymer with vinyl terminal units on the polymer with vinyl in-chain, the process aid and the treated fumed silica totalling a weight of 168 parts by weight of Example 1 was utilized in this example also. This will be referred to as Formulation A To Formulation A there was various types of potential inhibitor compounds as indicated in Table II below in the quantities indicated, and also 0.02 parts of Lamoreaux's platinum catalyst and 3.2 parts of the hydride cross-linking agent identified in Example 1 in each case. For comparison purposes, there was also prepared a similar composition which shall be referred to as Formulation B in which there was prepared by mixing 80 parts of the vinylterminated polymer of Example 1, 20 parts by weight of the vinyl in-chained reinforcing polymer of Example 1, 3 parts of the process aid of Example 1, and 67 parts of the treated fumed silica of Example 1, to provide the basic total weight composition of Formulation B of 170 parts by weight. To this basic composition there was added 0.02 parts of the Lamoreaux platinum catalyst and 3 parts by weight of the hydride cross-linking agent of Example 1 in each case. There was then utilized in this basic composition known as Formulation B, the potential inhibitor additives disclosed in Table II below. The results of the testing of these compositions in terms of work life are set forth in Table II below.

indicate it is the hydroperoxy compound of the instant case that affects the inhibition activity.

In addition, as noted in the case of ordinary peroxides tested, this inhibition activity is not noted with all peroxide compounds so that the inhibition activity noted may be caused by other radicals in the compounds. In any case, such peroxide compounds do not in any way or manner impart inhibiting activity comparable to the efficient and exceptional inhibition activity produced by the hydroperoxy radical of hydroperoxy containing compounds.

I claim:

1. A platinum catalyzed silicone rubber composition with an improved work life comprising (a) 100 parts by weight of a vinyl-containing base linear polysiloxane of the formula,

and blends of such polysiloxanes, where R is selected from the class consisting of alkyl radicals of 1 to 8 carbon atoms, vinyl radicals, phenyl radicals, fluoroalkyl radicals of 3 to 10 carbon atoms and mixtures thereof, where the vinyl radical unsaturation in said polymer is at least 0.005 mole percent, a varies from 1.98 to 2.01, (b) at least 0.1 parts per million of platinum, (c) from 1 to 50 parts by weight of a hydrogen-containing polysiloxane, and (d) at least 0.007 parts by weight of an inhibitor compound having at least one radical of the formula, — C — O — O — H, per 100 parts of said vinyl-containing polymer.

2. The composition of claim 1 wherein the vinyl-containing base polysiloxane has the formula,

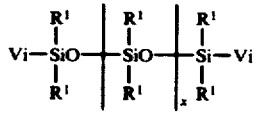

and has a viscosity that varies from 1,000 to 300,000,000 centipoise at 25° C, where Vi is vinyl and $R^1$ is selected from the class consisting of vinyl, phenyl, alkyl radicals of 1 to 8 carbon atoms, fluoroalkyl radicals of 3 to 10 carbon atoms and mixtures thereof and where x varies from 330 to 11,000.

3. A composition of claim 1 wherein there is present a blend of vinyl-containing polysiloxanes comprised of a first polysiloxane of the formula of claim 2, with 1 to

TABLE II

| Formulation | Peroxide Type | Parts | Work Life of Compound | Shore A | Tensile Strength (psi) | Elongation (%) | Die B Tear Strength (pi) |
|---|---|---|---|---|---|---|---|
| A | 2,5-dimethyl-2,5-dihydroperoxy hexane | 1 | >14 days | 38 | 410 | 1100 | 140 |
| B | Cumene Hydroperoxide | 1 | >4 days | 65 | 1250 | 1000 | 235 |
| B | Lupersol DDM (60% methylethyl ketone hydroperoxide in dimethyl phthalate) | 0.2 | >6 days | 70 | 1112 | 820 | 267 |
| B | Lupersol DDM (60% methylethyl ketone hydroperoxide in dimethyl phthalate) | 0.02 | >1 day | 65 | 1020 | 960 | 216 |
| B | Dimethyl phthalate | 0.25 | <3 hours | | | cured | |
| B | Dimethyl phthalate | 0.5 | <3 hours | | | cured | |
| B | Dimethyl phthalate | 1 | <3 hours | | | cured | |
| B | Lupersol 215 (1,1,3,3-tetramethyl butyl hydroperoxide) | 0.43 | >1 day | 66 | 1210 | 960 | 236 |
| B | Lupersol 215 (1,1,3,3-tetramethyl butyl hydroperoxide) | 0.86 | >4 days | 68 | 1211 | 1000 | 237 |
| B | Lupersol 215 (1,1,3,3-tetramethyl butyl hydroperoxide) | 2 | >5 days | 68 | 969 | 940 | 223 |
| A | t-butyl peroxy isopropyl carbonate | 2 | 2 hours | | | cured | |

As the results indicate above, even though in some cases certain ordinary peroxides may cause some inhibitor activity which may be due possibly to some other cause than the peroxide radical the hydroperoxy compounds and this includes all the hydroperoxy compounds tested and because of the hydroperoxy radicals results in significantly greater inhibition at the same levels in SiH-olefin platinum catalyzed compositions, so as to result in extended work life. Also, as this example and Table II 50 parts by weight of a second vinyl-containing polysiloxane of the formula,

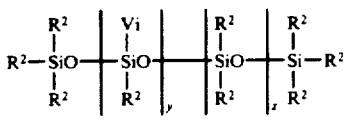

where Vi is vinyl and $R^2$ is selected from the class consisting of alkyl radicals of 1 to 8 carbon atoms, phenyl, fluoroalkyl radicals of 3 to 10 carbon atoms and mixtures thereof, y varies from 1 to 4,000 and z varies from 1 to 4,000, which have a viscosity that varies from 1,000 to 1,000,000 centipoise at 25° C.

4. The composition of claim 3 wherein said first polysiloxane has a viscosity that varies from 1,000,000 to 200,000,000 centipoise at 25° C and said second polysiloxane has a viscosity that varies from 50,000 to 500,000 centipoise at 25° C.

5. The composition of claim 1 wherein the vinyl content of said vinyl-containing polysiloxane and blends of polysiloxane varies from 0.01 to 1.0 mole percent.

6. The composition of claim 1 wherein the concentration of said platinum catalyst varies from 1 to 50 parts per million 7. The compositon of claim 1 wherein the hydride compound is a hydride resin composed of,

units and $SiO_2$ units where the ratio of $R^3$ to Si varies from 1.1 to 1.9 and $R^3$ is selected from the class consisting of alkyl radicals of 1 to 8 carbon atoms, phenyl radicals and fluoroalkyl radicals of 3 to 10 carbon atoms.

8. The composition of claim 1 wherein the hydride compound is a hydride resin composed of,

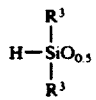

units, $SiO_2$ units and $(R^3)_2SiO$ units where the $R^3$ to Si ratio may vary from 1.5 to 2.1 and $R^3$ is selected from the class consisting of alkyl radicals of 1 to 8 carbon atoms, phenyl radicals and fluoroalkyl radicals of 3 to 10 carbon atoms.

9. The composition of claim 1 wherein the hydride compound is a hydride containing polysiloxane of the formula,

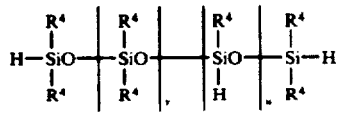

where $R^4$ is selected from the class consisting of alkyl radicals of 1 to 8 carbon atoms, phenyl, fluoroalkyl radicals of 3 to 10 carbon atoms, and hydrogen, v varies from 1 to 1000 and w varies from 0 to 200 and the viscosity of the polymer varies from 1 to 10,000 centipoise at 25° C.

10. The composition of claim 1 wherein there is present per 100 parts of (a) from 5 to 150 parts of a filler selected from the class consisting of titanium oxide, lithopone, zinc oxide, zirconium silicate, silica aerogel, iron oxide, diatomaceous earth, calcium carbonate, fumed silica, cyclicpolysiloxane treated silica, silazane treated silica, precipitated silica, glass fibers, magnesium oxide, chromic oxide, zirconium oxide, alpha quartz, calcined clay, asbestos, carbon, graphite, cork, cotton and synthetic fibers.

11. The composition of claim 1 wherein the concentration of the inhibitor compound varies from 0.01 to 10 parts.

12. The composition of claim 11 wherein the inhibitor compound is tertiary butyl hydroperoxide.

13. The composition of claim 11 wherein the inhibitor compound is methylethylketone peroxides.

14. The compositon of claim 11 wherein the inhibitor compound is cumene hydroperoxide.

15. The composition of claim 11 wherein the inhibitor compound is 1,1,3,3-tetramethylbutyl hydroperoxide.

16. The composition of claim 1 wherein the inhibitor compound is 2,5-dimethyl-2,5-dihydroperoxyhexane.

17. A process for forming a silicone composition which in the uncured state and at room temperature has a controlled work life comprising (A) mixing (a) 100 parts by weight of a vinyl-containing base linear polysiloxane of the formula,

and blends of such polysiloxanes where R is selected from the class consisting of alkyl radicals of 1 to 8 carbon atoms, vinyl radicals, phenyl radicals, fluoroalkyl radicals of 3 to 10 carbon atoms and mixtures thereof where the vinyl radical concentration in polysiloxanes is at least 0.005 mole percent, a varies from 1.98 to 2.01 with (b) at least 0.1 parts per million of platinum, and (c) from 1 to 50 parts by weight of a hydride compound which is a hydrogen-containing polysiloxane and (d) at least 0.007 parts by weight of an inhibitor compound having at least one radical — C — O — O — H per 100 parts of said vinyl-containing polymer and (b) allowing the composition to cure.

18. The process of claim 17 wherein the vinyl-containing per polysiloxane has the formula,

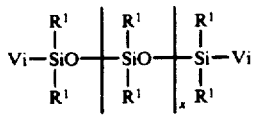

and has a viscosity that varies from 1,000 to 300,000,000 centipoise at 25° C, where Vi is vinyl and $R^1$ is selected from the class consisting of vinyl, phenyl, alkyl radicals of 1 to 8 carbon atoms, fluoralkyl radicals of 3 to 10 carbon atoms and mixtures thereof and where x varies from 330 to 11,000.

19. A process wherein there is present a blend of vinyl-containing base polysiloxanes of a first polysiloxane of the formula of claim 18 with 1 to 50 parts by weight of a second vinyl-containing polysiloxane of the formula,

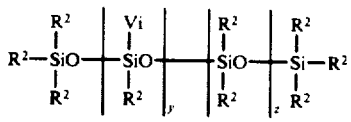

where Vi is vinyl and $R^2$ is selected from the class consisting of alkyl radicals of 1 to 8 carbon atoms, phenyl, fluoroalkyl radicals of 3 to 10 carbon atoms and mixtures thereof, $y$ varies from 1 to 4,000 and $z$ varies from 1 4,000 which has a viscosity that varies from 1,000 to 1,000,000 centipoise at 25° C.

20. The process of claim 19 wherein said first polysiloxane has a viscosity that varies from 1,000,000 to 300,000,000 centipoise at 25° C and said second polysiloxane has a viscosity that varies from 50,000 to 500,000 centipoise at 25° C.

21. The process of claim 17 wherein the vnyl content of said vinyl-containing polysiloxane and blends of polysiloxane varies from 0.01 to 1.0 mole percent.

22. The process of claim 17 wherein the concentration of platinum catalyst varies from 1 to 50 parts per million.

23. The process of claim 17 wherein the hydride compound is a hydride resin composed of

units and $SiO_2$ units where the ratio of $R^3$ is Si varies from 1.1 to 1.9 and $R^3$ is selected from the class consisting of alkyl radicals of 1 to 8 carbon aotms, phenyl radicals, and fluoroalkyl radicals of 3 to 10 carbon atoms.

24. The process of claim 17 wherein the hydride compound is a hydride resin composed of

units, $SiO_2$ units and $(R^3)_2SiO$ units where the $R^3$ to Si ratio may vary from 1.5 to 2.1 and $R^3$ is selected from the class consisting of alkyl radicals of 1 to 8 carbon atoms, phenyl radicals and fluoroalkyl radicals of 3 to 10 carbon atoms.

25. The process of claim 17 wherein the hydride compound is a hydride containing polysiloxane of the formula,

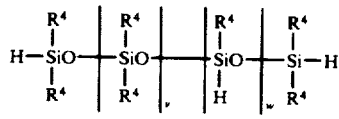

where $R^4$ is selected from the class consisting of alkyl radicals of 1 to 8 carbon atoms, phenyl, fluoroalkyl radicals of 3 to 10 carbon atoms and hydrogen, $v$ varies from 1 to 1000 and $w$ varies from 0 to 200 and the viscosity of the polymer varies from 1 to 10,000 centipoise at 25° C.

26. The process of claim 17 wherein there is present per 100 parts of (a) from 5 to 150 parts of a filler selected from the class consisting of titanium oxide, lithopone, zinc oxide, zirconium silicate, silica aerogel, iron oxide, diatomaceous earth, calcium carbonate, fumed silica, cyclic polysiloxane treated silica, silazane treated silica, precipitated silica, glass fibers, magnesium oxide, chromic oxide, zirconium oxide, alpha quartz, calcined clay, asbestos, carbon, graphite, cork, cotton and synthetic fibers.

27. The process of claim 17 wherein the concentration of the inhibitor compound varies from 0.01 to 10 parts.

28. The process of claim 17 wherein said inhibitor compound is tertiary butyl hydroperoxide.

29. The process of claim 17 wherein said inhibitor compound is methylethyl ketone peroxides.

30. The process of claim 17 wherein said inhibitor compound is cumene hydroperoxide.

31. The process of claim 17 wherein said inhibitor compound is 1,1,3,3-tetramethylbutyl hydroperoxide.

32. The process of claim 17 wherein said inhibitor compound is 2,5-dimethyl-2,5-dihydroperoxyhexane.

33. The process of claim 17 wherein the composition is cured at room temperature.

34. The process of claim 17 wherein the compositon is cured at elevated temperatures.

* * * * *